(12) United States Patent
Gonzalez

(10) Patent No.: US 9,702,401 B2
(45) Date of Patent: Jul. 11, 2017

(54) COMBINATION THRUST-BEARING AND RADIAL BEARING APPARATUSES

(71) Applicant: US SYNTHETIC CORPORATION, Orem, UT (US)

(72) Inventor: Jair J. Gonzalez, Provo, UT (US)

(73) Assignee: US SYNTHETIC CORPORATION, Orem, UT (US)

( * ) Notice: Subject to any disclaimer, the term of this patent is extended or adjusted under 35 U.S.C. 154(b) by 0 days.

(21) Appl. No.: 14/826,121

(22) Filed: Aug. 13, 2015

(65) Prior Publication Data
US 2015/0345557 A1    Dec. 3, 2015

Related U.S. Application Data

(62) Division of application No. 13/792,778, filed on Mar. 11, 2013, now Pat. No. 9,127,708.

(51) Int. Cl.
*F16C 17/10*    (2006.01)
*F16C 33/24*    (2006.01)
(Continued)

(52) U.S. Cl.
CPC ............... *F16C 17/10* (2013.01); *E21B 3/00* (2013.01); *E21B 4/003* (2013.01); *F16C 17/107* (2013.01); *F16C 33/043* (2013.01); *F16C 33/108* (2013.01); *F16C 33/24* (2013.01); *F16C 33/26* (2013.01); *F16C 43/02* (2013.01);
(Continued)

(58) Field of Classification Search
CPC ...... F16C 17/10; F16C 17/107; F16C 33/043; F16C 33/24; E21B 4/003
See application file for complete search history.

(56) References Cited

U.S. PATENT DOCUMENTS 4,560,014 A    12/1985    Geczy
4,720,199 A    1/1988    Geczy
(Continued)

FOREIGN PATENT DOCUMENTS

WO    WO 2009/051938    4/2009

OTHER PUBLICATIONS

International Search Report and Written Opinion from International Application No. PCT/US2014/017479 mailed Jun. 27, 2014.
(Continued)

*Primary Examiner* — Thomas R. Hannon
(74) *Attorney, Agent, or Firm* — Dorsey & Whitney LLP

(57) ABSTRACT

Embodiments of the invention relate to bearing apparatuses in which one bearing surface of the bearing apparatus includes diamond, while another bearing surface includes a non-diamond superhard material (e.g., silicon carbide). For example, a bearing apparatus may include a bearing stator assembly and a bearing rotor assembly. The bearing stator assembly and bearing rotor assembly each include a support ring and one or more superhard bearing elements generally opposed to one another. The bearing surface(s) of the rotor or stator may include diamond, while the bearing surface(s) of the other of the rotor or stator do not include diamond. Another bearing apparatus may include both thrust- and radial bearing components. The generally opposed thrust-bearing elements may include diamond, while the generally opposed radial bearing elements may not include diamond, but include a non-diamond superhard material, such as silicon carbide.

23 Claims, 10 Drawing Sheets

(51) Int. Cl.
　　*E21B 3/00*　　　　(2006.01)
　　*E21B 4/00*　　　　(2006.01)
　　*F16C 43/02*　　　(2006.01)
　　*F16C 33/04*　　　(2006.01)
　　*F16C 33/10*　　　(2006.01)
　　*F16C 33/26*　　　(2006.01)

(52) U.S. Cl.
　　CPC ...... *F16C 2202/20* (2013.01); *F16C 2206/04* (2013.01); *F16C 2206/40* (2013.01); *F16C 2352/00* (2013.01)

(56) References Cited

U.S. PATENT DOCUMENTS

| | | |
|---|---|---|
| 4,802,539 A | 2/1989 | Hall et al. |
| 4,892,420 A | 1/1990 | Kruger |
| 7,516,804 B2 | 4/2009 | Vail |
| 7,866,418 B2 | 1/2011 | Bertagnolli et al. |
| 7,998,573 B2 | 8/2011 | Qian et al. |
| 8,236,074 B1 | 8/2012 | Bertagnolli et al. |
| 8,297,382 B2 | 10/2012 | Bertagnolli et al. |
| 2007/0081749 A1 | 4/2007 | Sexton et al. |
| 2013/0182980 A1 | 7/2013 | Peterson et al. |
| 2014/0254967 A1 | 9/2014 | Gonzalez |

OTHER PUBLICATIONS

U.S. Appl. No. 13/792,778, Jul. 23, 2014, Office Action.
U.S. Appl. No. 13/792,778, Oct. 28, 2014, Office Action.
U.S. Appl. No. 13/792,778, Jan. 14, 2015, Office Action.
U.S. Appl. No. 13/792,778, May 4, 2015, Notice of Allowace.

COMBINATION THRUST-BEARING AND RADIAL BEARING APPARATUSES

CROSS-REFERENCE TO RELATED APPLICATIONS

This application is a division of U.S. application Ser. No. 13/792,778 filed on 11 Mar. 2013, the disclosure of which is incorporated herein, in its entirety, by this reference.

BACKGROUND

Wear-resistant, polycrystalline diamond compacts ("PDCs") are utilized in a variety of mechanical applications, including bearing apparatuses. For example, the bearing apparatuses may be thrust-bearing apparatuses or radial bearing apparatuses.

Bearing elements included in such bearing apparatuses may comprise a PDC typically including a superhard polycrystalline diamond ("PCD") layer commonly known as a diamond table. The diamond table is formed and bonded to a substrate using a high-pressure/high-temperature ("HPHT") process. The PDC bearing element may be brazed into a preformed pocket, socket, or other receptacle formed in a bearing support ring.

Despite the availability of a number of different bearing apparatuses including such PDCs, manufacturers and users of bearing apparatuses continue to seek bearing apparatuses that exhibit improved performance characteristics, lower cost, or both.

SUMMARY

Embodiments of the invention relate to bearing apparatuses including a bearing stator assembly and a bearing rotor assembly. The bearing stator assembly and bearing rotor assembly each include a support ring and one or more superhard bearing elements, with each of the one or more superhard bearing elements including a respective bearing surface. The bearing surfaces of the bearing stator assembly and bearing rotor assembly are generally opposed to one another. The bearing apparatus is specifically configured so that the bearing surface(s) of the rotor and the bearing surface(s) of the stator include different materials. For example, the bearing surface(s) of one of the rotor or stator may include diamond (e.g., polycrystalline diamond), while the bearing surface(s) of the other of the rotor or stator may not include diamond, but may include a non-diamond superhard material (e.g., silicon carbide) or another type of material such as a diamond-silicon carbide composite.

Such configurations advantageously provide bearing apparatuses that may be manufactured at lower cost, as compared to configurations that employ PCD bearing surfaces on both generally opposed bearing surfaces. In addition to reduced initial cost, additional benefits of such a configuration may include that the rotor or stator that does not include diamond may wear preferentially, so as to fail or otherwise wear out before the other of the rotor or stator that does include diamond. The non-diamond rotor or stator may be replaced at significantly lower cost than replacement of the entire bearing apparatus (i.e., both rotor and stator) where both rotor and stator bearing surfaces comprise diamond. Failure of the non-diamond bearing surface(s) may advantageously not result in damage to downstream equipment such as valves or other components that would be damaged by failure of a diamond bearing surface.

In addition, diamond bearing surfaces exhibit significantly higher thermal conduction than other superhard materials, such as silicon carbide. Because of this difference, use of silicon carbide or similar non-diamond superhard materials for both stator and rotor bearing surfaces may not allow sufficient heat transfer away from the bearing surfaces for practical use in some applications. Use of a diamond rotor or stator with a silicon carbide or other non-diamond superhard material for the other of the rotor or stator may provide improved heat transfer away from the silicon carbide or other non-diamond superhard material bearing surface. Thus, while use of non-diamond superhard material for both stator and rotor bearing surfaces may not be practical in some applications, use of a diamond and non-diamond bearing surfaces for the stator and rotor may overcome such thermal management problems.

In an embodiment, a bearing apparatus may include a thrust-bearing assembly and a radial bearing assembly in which the bearing surfaces of both the stator and rotor of the thrust-bearing assembly include diamond, and the bearing surfaces of both the stator and rotor of the radial bearing assembly do not include diamond, but comprise another superhard material (e.g., silicon carbide). For example, such a thrust-bearing assembly may include a thrust-bearing stator and a thrust-bearing rotor, each including a stator support ring and one or more superhard bearing element(s). The superhard stator and rotor thrust-bearing element(s) each include respective superhard thrust-bearing surface(s) that are generally opposed to one another. The radial bearing assembly may include a radial bearing stator and a radial bearing rotor, each including a support ring and one or more superhard bearing element(s). The superhard stator and rotor radial bearing elements each include respective superhard radial bearing surfaces that are substantially opposed to one another. The superhard stator and rotor thrust-bearing surfaces may include diamond, while the superhard stator and rotor radial bearing surfaces may not include diamond, but include another superhard material (e.g., silicon carbide).

Embodiments of the invention also relate to methods of use in which a bearing structure that does not include diamond is used with a generally oppositely disposed other bearing structure that does include diamond, so that the bearing structure that does not include diamond wears preferentially, and is replaced after a period of use. Thus a single bearing structure (e.g., a rotor) that does include diamond may be employed sequentially with a plurality of corresponding non-diamond bearing structures (e.g., stators) that wear preferentially, and are replaced before the diamond bearing structure needs to be replaced.

For example, a bearing assembly may be provided, as described above, in which either the rotor or stator includes diamond, while the other of the rotor or stator does not include diamond, but includes another superhard material (e.g., silicon carbide). After a period of use during which the non-diamond bearing rotor or stator may wear preferentially, the non-diamond bearing rotor or stator may be replaced.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical or similar elements or features in different views or embodiments shown in the drawings.

DETAILED DESCRIPTION

Figure 1:
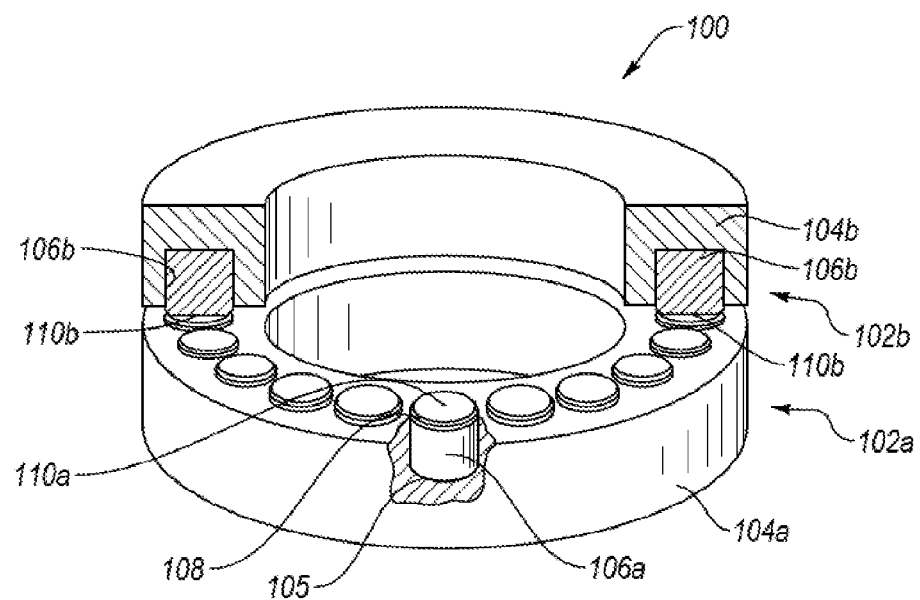
FIG. 1 is an isometric cutaway view of an embodiment of a thrust-bearing apparatus, which may employ differing materials for the bearing surfaces of the rotor and stator.

Embodiments of the invention relate to bearing assemblies, bearing apparatuses, and methods of use in which one or more or at least a portion of one or more bearing surfaces of the rotor and/or the bearing surfaces of the stator include different materials. For example, the bearing surface(s) of one of the rotor or stator may include diamond (e.g., polycrystalline diamond), while the bearing surface(s) of the other of the rotor or stator do not include diamond, but include another superhard material (e.g., silicon carbide).

Another embodiment of the invention relates to bearing apparatuses including both a thrust-bearing assembly and a radial bearing assembly in which the bearing surfaces of the thrust-bearing assembly include diamond, while the bearing surfaces of the radial bearing assembly do not include diamond, but include another superhard material.

The diamond bearing surfaces may be in the form of PCD, which may be attached to a substrate to form a PDC. For example, in any of the embodiments disclosed herein the bearing surfaces that employ PCD and/or a PDC may be formed and/or structured as disclosed in U.S. Pat. Nos. 7,516,804; 7,866,418; 8,236,074; and 8,297,382; which are incorporated herein, in their entirety, by this reference. PCD includes a plurality of directly bonded together diamond grains exhibiting diamond-to-diamond bonding (e.g., $sp^3$ bonding) therebetween, with a catalyst disposed in at least a portion of the interstitial regions defined by the diamond grains. In some embodiments, the catalyst may comprise a metal-solvent catalyst (e.g., cobalt, iron, nickel, or alloys thereof) or a nonmetallic catalyst such as a carbonate catalyst. Furthermore, in any of the bearing surfaces that use PCD, the catalyst used to form the PCD (e.g., cobalt) may be leached to a selected depth from the bearing surface.

The diamond particles that are HPHT sintered to form the PCD used in the bearing elements disclosed herein may include one or more selected sizes that may be determined, for example, by passing the diamond particles through one or more sizing sieves or by any other method. In an embodiment, the plurality of diamond particles may include a relatively larger size and at least one relatively smaller size. As used herein, the phrases "relatively larger" and "relatively smaller" refer to particle sizes determined by any suitable method, which differ by at least a factor of two (e.g., 40 µm and 20 µm). More particularly, in various embodiments, the plurality of diamond particles may include a portion exhibiting a relatively larger size (e.g., 100 µm, 90 µm, 80 µm, 70 µm, 60 µm, 50 µm, 40 µm, 30 µm, 20 µm, 15 µm, 12 µm, 10 µm, 8 µm) and another portion exhibiting at least one relatively smaller size (e.g., 30 µm, 20 µm, 10 µm, 15 µm, 12 µm, 10 µm, 8 µm, 4 µm, 2 µm, 1 µm, 0.5 µm, less than 0.5 µm, 0.1 µm, less than 0.1 µm). In an embodiment, the plurality of diamond particles may include a portion exhibiting a relatively larger size between about 40 µm and about 15 µm and another portion exhibiting a relatively smaller size between about 15 µm and 2 µm. The plurality of diamond particles may also include three or more different sizes (e.g., one relatively larger size and two or more relatively smaller sizes) without limitation. The diamond grain size of the PCD so formed after HPHT sintering may be substantially the same or similar to the diamond particles used to form the PCD or the PCD of a PDC.

In an embodiment, other forms of diamond may also be employed, such as natural diamond, other synthetic diamond, a diamond-silicon carbide composite as disclosed in U.S. Pat. No. 7,998,573 that is incorporated herein in its entirety by this reference, diamond deposited by chemical vapor deposition, diamond or diamond-like carbon deposited by physical vapor deposition, or other deposition technique.

As used herein, a non-diamond superhard material employed for the non-diamond bearing surface is a non-diamond material exhibiting a hardness that is at least as hard as tungsten carbide. Examples of non-diamond superhard materials include, but are not limited to, polycrystalline cubic boron nitride, silicon carbide, tungsten carbide, tantalum carbide, other carbides exhibiting a hardness at least equal to that of tungsten carbide, or any combination of the foregoing.

The disclosed bearing apparatuses may be used in a number of applications, such as downhole motors in subterranean drilling systems, directional drilling systems, pumps, transmissions, gear boxes, and many other applications.

FIG. 1 is an isometric cutaway view of an embodiment of a thrust-bearing apparatus 100, which may employ diamond bearing elements (e.g., PCD bearing elements) on one or both of the thrust-bearing assemblies 102a, 102b. For example, any suitable PDC may be used as bearing elements. A non-diamond superhard material may be employed for at least one of the bearing surfaces of at least one of the thrust-bearing assemblies. For example, one of the thrust-bearing assemblies 102a, 102b may include diamond bearing elements, while the other of the thrust-bearing assemblies 102a, 102b may include bearing elements using a non-diamond superhard material. Each thrust-bearing assembly 102a, 102b includes an annular support ring 104a, 104b that may be fabricated from any suitable material, such as carbon steel, stainless steel, a superhard material (e.g., silicon carbide, tantalum carbide, or another carbide), or another suitable material. In an embodiment, each support ring 104a, 104b may include a plurality of pockets or recesses 105 that receives a corresponding bearing element 106a, 106b. For example, each bearing element 106a, 106b may be mounted to a corresponding support ring 104a, 104b within a corresponding recess by brazing, interference-fitting, using fasteners, or another suitable mounting technique. Alternatively, the bearing elements 106a, 106b may be mounted onto a surface of support ring 104a, 104b, respectively, without being received into a corresponding recess.

In an embodiment, bearing elements 106a mounted into or on support ring 104a may include a PCD bearing surface, while bearing elements 106b mounted into or on support ring 104b may not include diamond, but include bearing surfaces that include a superhard material other than diamond (e.g., silicon carbide or another carbide or other ceramic). For example, bearing elements 106a may comprise PDCs including a PCD table 108 that may be metallurgically bonded to a substrate (e.g., a cemented carbide substrate). In an embodiment, the substrate of bearing elements 106a to which PCD table 108 is bonded may comprise cobalt-cemented tungsten carbide or another suitable carbide material that may include chromium carbide, tantalum carbide, vanadium carbide, or combinations thereof as an alternative to or in addition to tungsten carbide. Each PCD table 108 may include a bearing surface 110a.

Bearing elements 106b may include a non-diamond superhard material. For example, elements 106b may be similarly shaped and sized as bearing elements 106a, but do not include a PCD table thereon, the bearing surface of bearing elements 106b being defined rather by a non-diamond superhard material. For example, bearing elements 106b may include a carbide, such as silicon carbide.

In use, bearing surfaces 110a of thrust-bearing assembly 102a bear against opposing bearing surfaces 110b of the other bearing assembly 102b. For example, one of the thrust-bearing assemblies 102a, 102b may be operably coupled to a shaft to rotate therewith and may be termed a "rotor." The other of the thrust-bearing assemblies 102a, 102b may be held stationary and may be termed a "stator."

Because bearing surfaces 110a and 110b may include different materials, non-diamond bearing surfaces may wear preferentially relative to bearing surfaces includes diamond. Providing such a bearing assembly including different material bearing surfaces may provide for better heat transfer and better maintenance of a fluid film between bearing surfaces 110a and 110b than if all bearing surfaces 110a and 110b included the same non-diamond superhard material (e.g., where both include silicon carbide).

Diamond has substantially higher thermal conductivity than superhard carbides, such as silicon carbide. Because one of bearing surfaces 110a, 110b (e.g., 110a) includes diamond, heat generated at non-diamond bearing surfaces may be better dissipated as a result of its proximity or contact with diamond bearing surfaces. Thus, a bearing assembly including differing bearing surface materials, as described, may provide increased wear resistance as compared to a bearing assembly in which all bearing surfaces include a non-diamond superhard material (e.g., silicon carbide), but at significantly lower cost than would be associated with a bearing assembly in which both of the opposed bearing surfaces include only diamond.

In an embodiment, the stator may include at least one non-diamond superhard bearing surface, such as only including non-diamond bearing surfaces. The stator within a bearing apparatus often fails before the rotor. In some instances, this may occur because the stator bearing surfaces are often subject to unequal heating and wear. For example, wear on a stator is often unequal as a result of a small number of stator bearing elements being somewhat more "prominent" than the other stator bearing elements. As a result, contact, heating, and wear during use may be preferentially associated with these more prominent stator bearing elements. For example, the bulk of the load and resulting wear may be borne by, for example, the one to three most prominent bearing elements, while the other stator bearing elements may show little wear by comparison. Such wear may result from the difficulty of perfectly aligning the bearing elements of the bearing assembly.

Because the stator may typically wear faster than the rotor, in an embodiment the stator bearing elements may not include diamond, but include a non-diamond superhard material, as the stator typically fails first anyway. In such embodiments, the stator may be replaced once failure or a given degree of wear occurs. In another embodiment, the stator may include at least one, one or more, or only diamond bearing surfaces, and the rotor may not include or may only include a small number of diamond bearing surfaces, such as including only non-diamond superhard material for bearing surfaces. It is currently believed that the configuration of thrust-bearing apparatus 100 facilitates faster breaking in of the bearing surfaces as the less hard bearing surfaces wear/break in relatively faster.

Figure 2A:
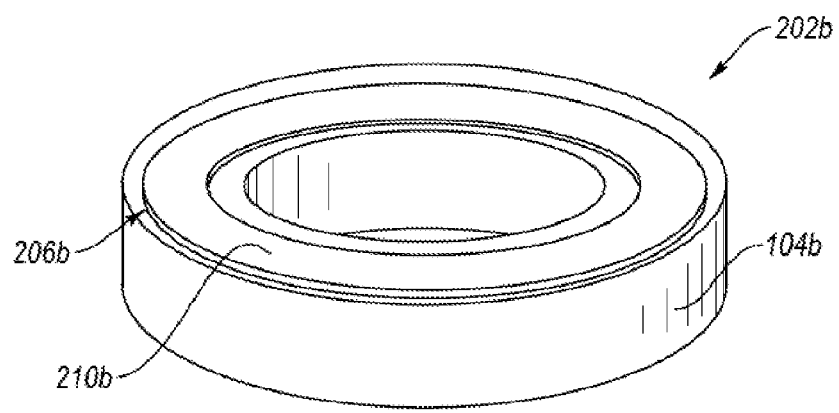
FIG. 2A is an isometric view of a thrust-bearing ring in which the bearing surface is a single substantially continuous surface.

FIG. 2A shows a thrust-bearing assembly 202b according to another embodiment. Thrust-bearing assembly 202b includes a single substantially continuous bearing surface 210b defined by a single substantially continuous bearing element 206b rather than a plurality of bearing elements. Such a configuration may improve wear performance as compared to an assembly in which the overall bearing surface is formed of a plurality of segmented, discontinuous bearing surfaces defined by the individual bearing elements. Wear performance may be improved because alignment of a single, large substantially continuous bearing element may be more readily achieved than alignment of a plurality of discontinuous, spaced apart bearing elements. In addition, the substantial absence of any discontinuities in the overall bearing surface (e.g., substantially planar in the context of the illustrated thrust-bearing assembly) may minimize and/or prevent chipping or cracking of substantially continuous bearing surface 210b and/or promote fluid film development.

Figure 2B:
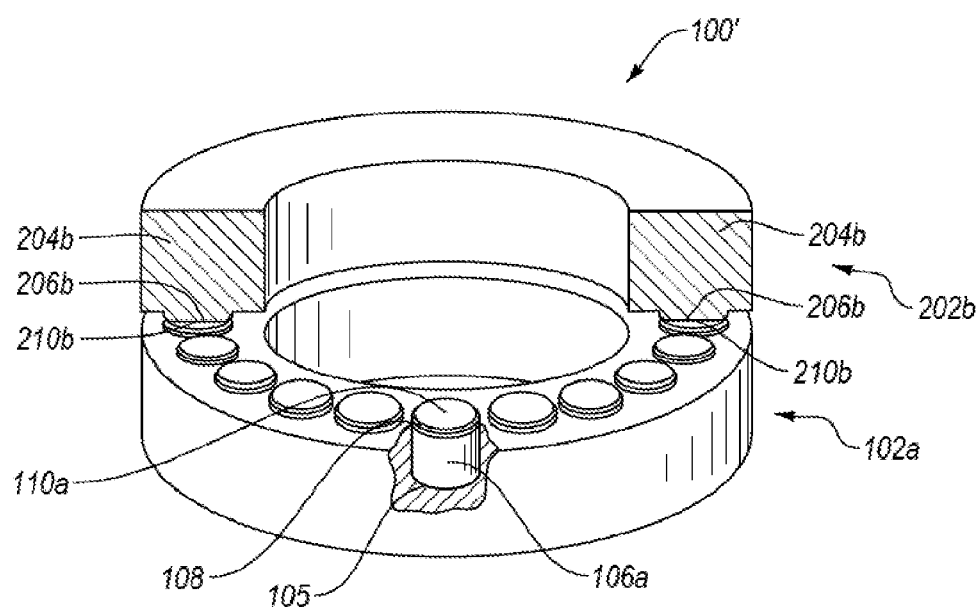
FIG. 2B is an isometric cutaway view of an embodiment of a thrust-bearing apparatus including the thrust-bearing ring of FIG. 2A with an oppositely oriented thrust-bearing ring in which the bearing surface is defined by a plurality of separate bearing elements so that the overall bearing surface is discontinuous.

FIG. 2B shows a bearing apparatus 100' according to an embodiment, which includes the bearing assembly 202b of FIG. 2A. Thus, one bearing assembly (e.g., assembly 202b) may include a single substantially continuous bearing surface (e.g., 210b), while the generally oppositely disposed bearing assembly (e.g., assembly 102a) may include a plurality of bearing elements, each defining a bearing surface (e.g., 110a) so that the overall ring-shaped bearing surface plane includes a plurality of discontinuous, separate bearing surfaces. In an embodiment, bearing surface 210b of bearing assembly 202b may not include diamond, but include a non-diamond superhard material while at least one of bearing surfaces 110a of bearing assembly 102a include diamond.

As shown, in an embodiment, bearing surface 210b and bearing element 206b may be provided integral with support ring 204b. For example, bearing element 206b and support ring 204b may be formed of a single piece of the same material (e.g., a carbide, such as tantalum carbide, tungsten carbide, silicon carbide, vanadium carbide, boron nitride, titanium nitride, or combinations thereof).

Figure 2C:
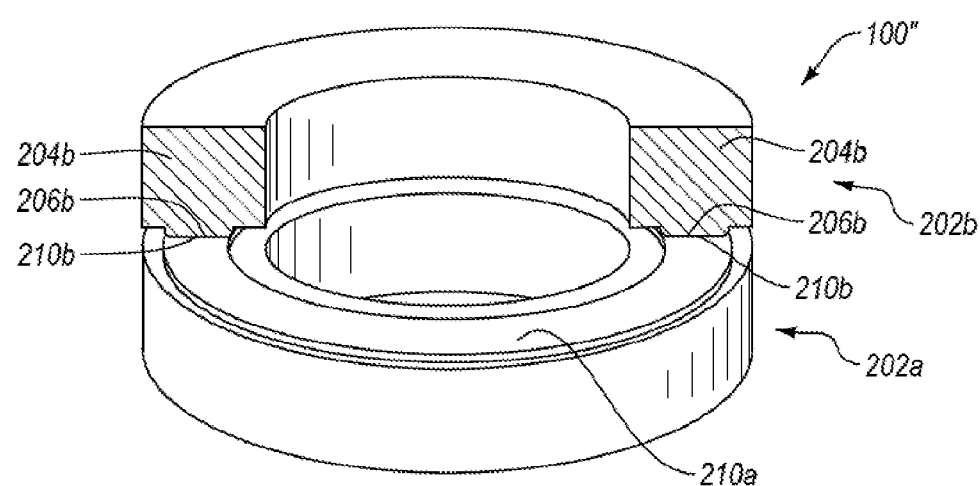
FIG. 2C is an isometric cutaway view of an embodiment of a thrust-bearing apparatus including two thrust-bearing rings similar to that shown in FIG. 2A so that the bearing surface of the rotor and stator are each formed by a single substantially continuous bearing element.

FIG. 2C shows another bearing apparatus 100" in which both bearing assemblies 202a and 202b each include a single substantially continuous bearing surface 210a and 210b, respectively. In an embodiment, one of bearing surfaces 210a or 210b (e.g., 210 a) may include diamond (e.g., polycrystalline diamond), while the other bearing surface does not include diamond, but includes a non-diamond superhard material. In an embodiment, at least a portion of bearing surfaces 210a or 210b (e.g., 210 a) may include diamond (e.g., polycrystalline diamond), while the other bearing surface does not include diamond but at least a portion of the bearing surface includes a non-diamond superhard material.

Figure 3:
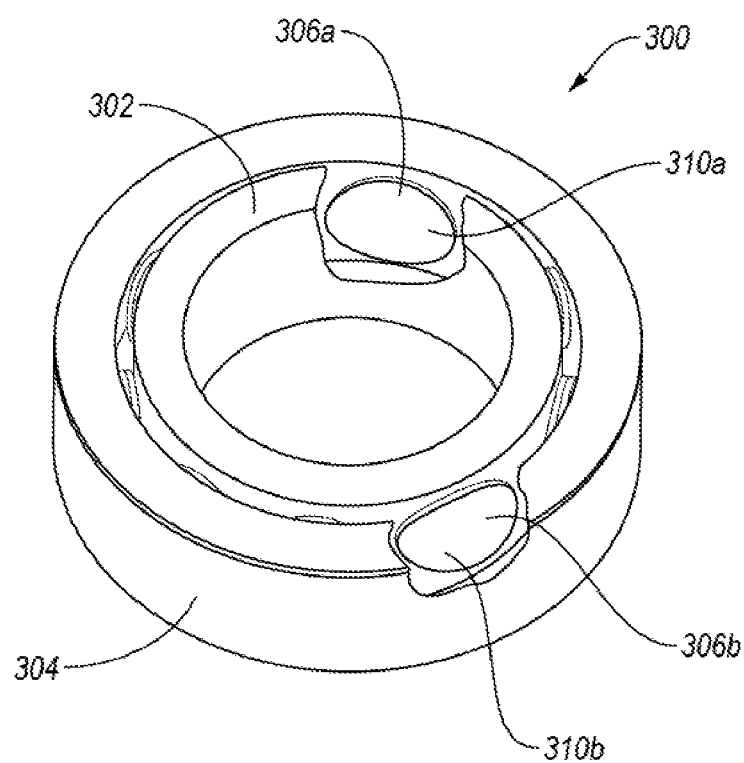
FIG. 3 is an isometric cutaway view of an embodiment of a radial bearing apparatus, which may employ differing materials for the bearing surfaces of the rotor and stator.

FIG. 3 is an isometric cutaway view of an embodiment of a radial bearing apparatus 300, which may employ different materials for at least a portion of the bearing surfaces of one or both of the assemblies in accordance with the principles of any of the disclosed embodiments. Radial bearing apparatus 300 includes an inner race 302 positioned generally within an outer race 304. Outer race 304 includes one or more bearing elements 306a mounted thereto that include respective bearing surfaces 310a. For such a radial bearing, bearing surface 310a of elements 306a mounted to outer race 304 may be concavely curved. Inner race 302 also includes a plurality of bearing elements 306b affixed thereto that have respective bearing surfaces 310b. For such a radial bearing, bearing surface 310b of elements 306b mounted to inner race 302 may be convexly curved to correspond with the concave curvature of bearing surface 310a. The inner race 302 is positioned generally within the outer race 304 and, thus, the inner race 302 and outer race 304 may be configured so that the bearing surfaces 310a and 310b may at least partially contact one another and move relative to each other as the inner race 302 and/or outer race 304 rotate relative to each other during use.

Either bearing elements 306a or bearing elements 306b may include a diamond (e.g., PCD) bearing surface, while one or both sets of bearing elements may include at least one bearing surface that includes a superhard material other than diamond (e.g., silicon carbide). In an embodiment, bearing surfaces 310b may include diamond (e.g., polycrystalline diamond), while bearing surfaces 310a may not include diamond, but include a non-diamond superhard material such as silicon carbide or another type of diamond material such as a diamond-silicon carbide composite. In an embodiment, outer race 304 may be a stator bearing assembly, while inner race 302 may be a rotor bearing assembly. In another embodiment, inner race 302 may be the stator, while outer race 304 may be the rotor.

Figure 4A:
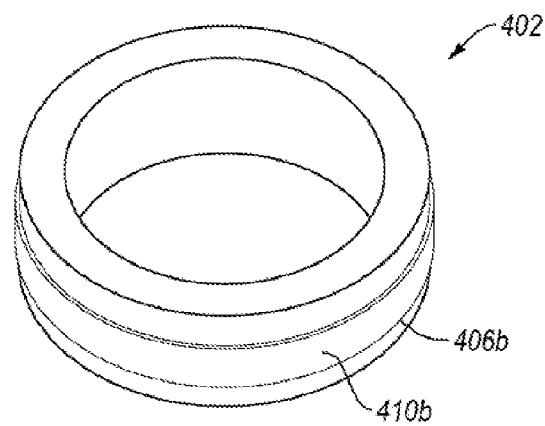
FIG. 4A is an isometric view of a radial bearing inner ring in which the bearing surface is a single substantially continuous surface.

FIG. 4A shows an inner race 402 for use in a radial bearing apparatus according to another embodiment. Inner race 402 includes a bearing element 406b defining a single substantially continuous bearing surface 410b. As described above, such a configuration may improve wear performance as compared to an assembly in which the overall bearing surface is comprised of a plurality of segmented, discontinuous bearing surfaces of the individual bearing elements and/or may promote fluid film development.

Figure 4B:
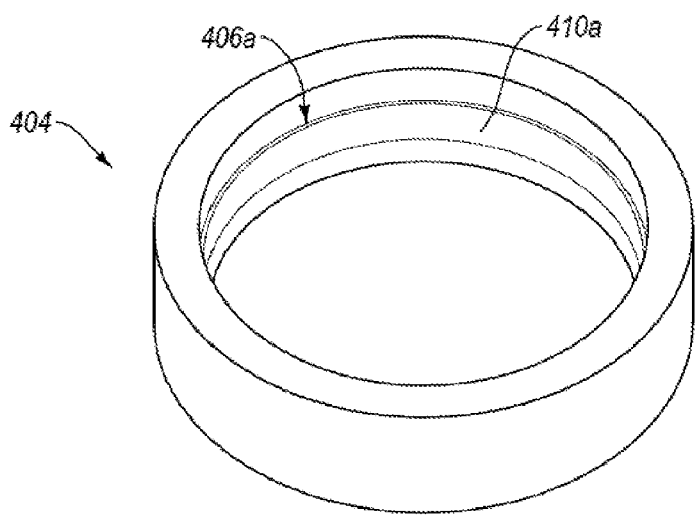
FIG. 4B is an isometric view of a radial bearing outer ring in which the bearing surface is a single substantially continuous surface.

FIG. 4B shows an outer race 404 for use in a radial bearing apparatus according to another embodiment. Outer race 404 includes a bearing element 406a defining a single substantially continuous bearing surface 410a. Such a configuration may improve wear performance as compared to an assembly in which the overall bearing surface is comprised of a plurality of segmented, discontinuous bearing surfaces of the individual bearing elements and/or may promote fluid film development.

Figure 4C:
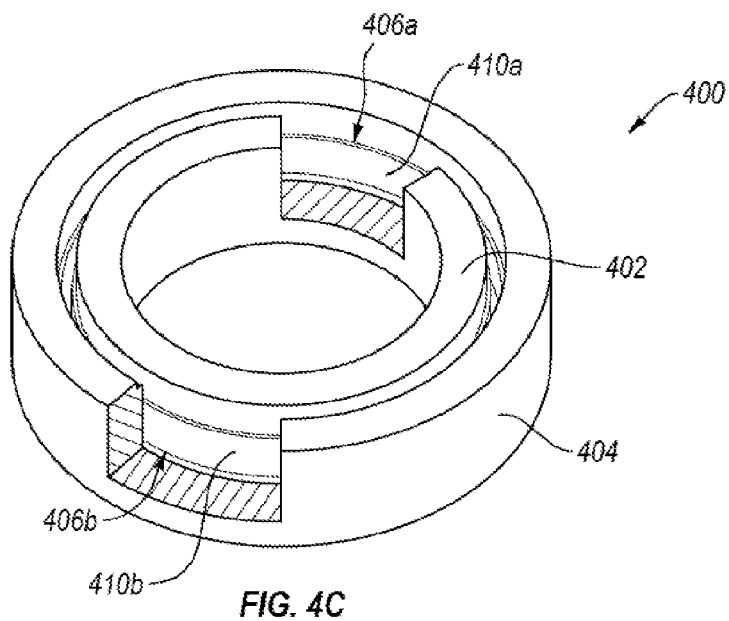
FIG. 4C is an isometric cutaway view of an embodiment of a radial bearing apparatus including the inner and outer radial bearing rings of FIGS. 4A and 4B so that the bearing surface of the rotor and stator are each formed by a single substantially continuous bearing element.

FIG. 4C shows an embodiment of a bearing apparatus 400 including inner race 402 of FIG. 4A and the outer race 404 of FIG. 4B so that both bearing elements 406a and 406b define substantially opposed bearing surfaces 410a and 410b that are each a single substantially continuous bearing surface, without any discontinuities or segments disposed therein. One of bearing surfaces 410a, 410b may include diamond (e.g., PCD), while the other of the bearing surfaces does not include diamond, but includes a non-diamond superhard material (e.g., silicon carbide). In an embodiment, at least a portion of one or both of bearing surfaces 410a, 410b may include diamond (e.g., PCD) and a non-diamond superhard material (e.g., silicon carbide).

Figure 4D:
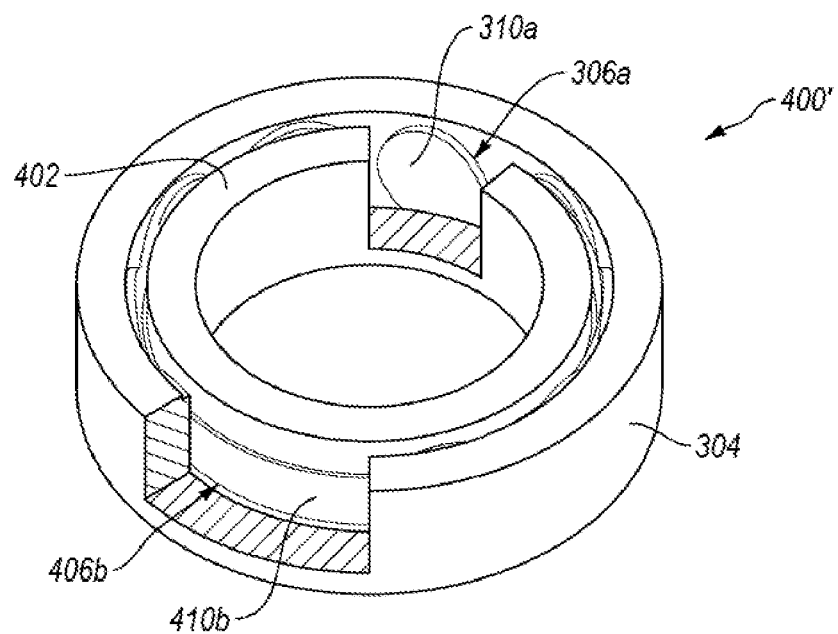
FIG. 4D is an isometric cutaway view of an embodiment of a radial bearing apparatus.
Figure 4E:
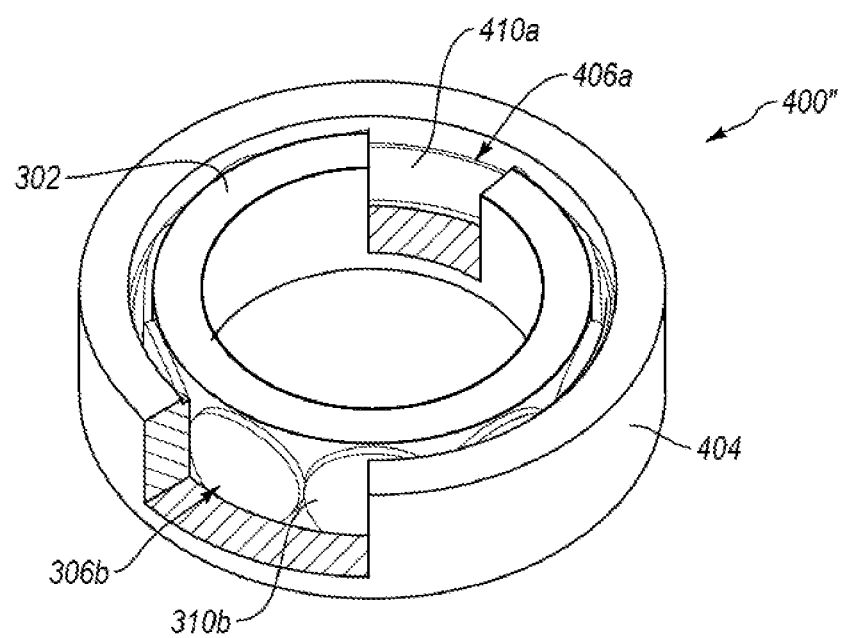
FIG. 4E is an isometric cutaway view of an embodiment of a radial bearing apparatus.

Various combinations of the illustrated inner and outer race configurations may be employed in other embodiments. For example, FIG. 4C shows a configuration in which both races each include a single bearing element defining a substantially continuous bearing surface, which surfaces are oriented substantially opposite to one another during use. FIGS. 4D and 4E show configurations 400' and 400" according to additional embodiments, in which either the inner race or outer race includes a single bearing element defining a substantially continuous bearing surface, while the other of the races includes a plurality of bearing elements, such that the overall bearing surface (e.g., resembling the inner or outer surface of a cylinder) is defined by a plurality of segmented or discontinuous bearing surfaces that are separate from one another.

FIG. 4D shows a further embodiment of a radial bearing apparatus. As shown, one bearing assembly (e.g., outer race 304) may include a plurality of bearing elements 306a, each defining a separate bearing surface 310a, while the other bearing assembly (e.g., inner race 402) may include a single substantially continuous bearing element that extends around substantially the entire perimeter of inner race 402, so as to define a single substantially continuous bearing surface 410b. In an embodiment, either bearing elements 306a or bearing element 406b comprise diamond (e.g., bearing elements 306a may comprise PCD or a PDC) while the other bearing element (e.g., bearing element 406b) may not comprise diamond, but comprises a non-diamond superhard material. In an embodiment, at least a portion of the bearing element 406b and/or the bearing surface 410b or the bearing elements 306a may include PCD.

FIG. 4E shows a configuration similar to, but reversed, as compared to FIG. 4D. For example, outer race 404 includes a single substantially continuous bearing element 406a and bearing surface 410a that extends along substantially the entire perimeter of outer race 404, while inner race 302 (e.g., similar to that seen in FIG. 3) may include a plurality of bearing elements 306b, each defining a separate bearing surface 310b. Either bearing elements 306b or bearing element 406a include diamond (e.g., bearing elements 306b may include diamond) while the other bearing element (e.g., bearing element 406a) may not include diamond, but includes a non-diamond superhard material.

Any of the radial bearing apparatuses disclosed herein may be employed in a variety of mechanical applications, such as roller cone bits, downhole motors, and turbines. For example, so-called roller cone rotary drill bits may benefit from a radial bearing apparatus. More specifically, the inner race may be mounted to a spindle of a roller cone and the outer race may be mounted to an inner bore formed within a cone such that the outer race and inner race may be assembled to form a radial bearing apparatus.

Figure 5A:
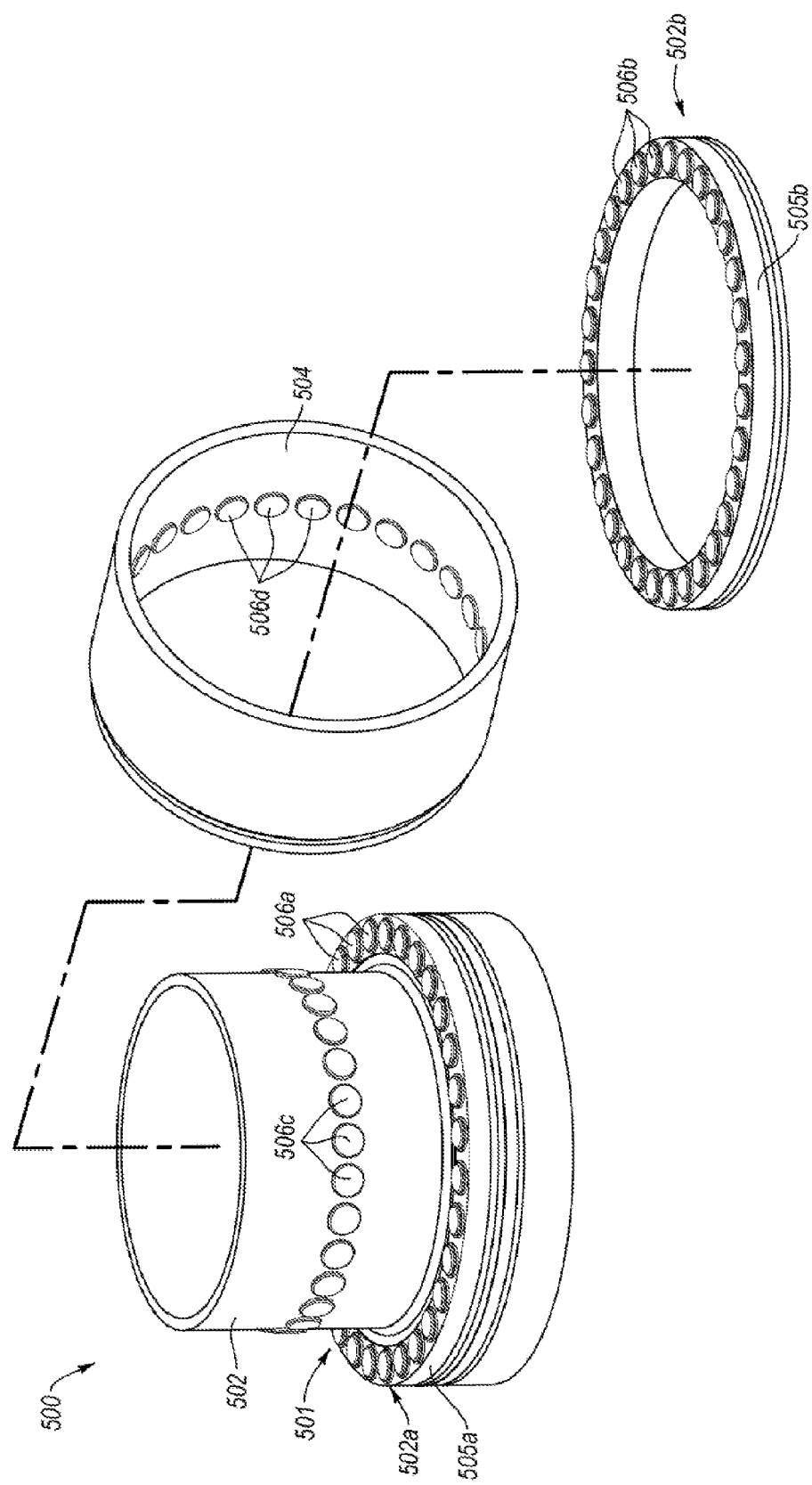
FIG. 5A is an isometric disassembled view of an embodiment of a bearing apparatus including both a thrust-bearing assembly and a radial bearing assembly, which may employ differing materials for one or more bearing surfaces.
Figure 5B:
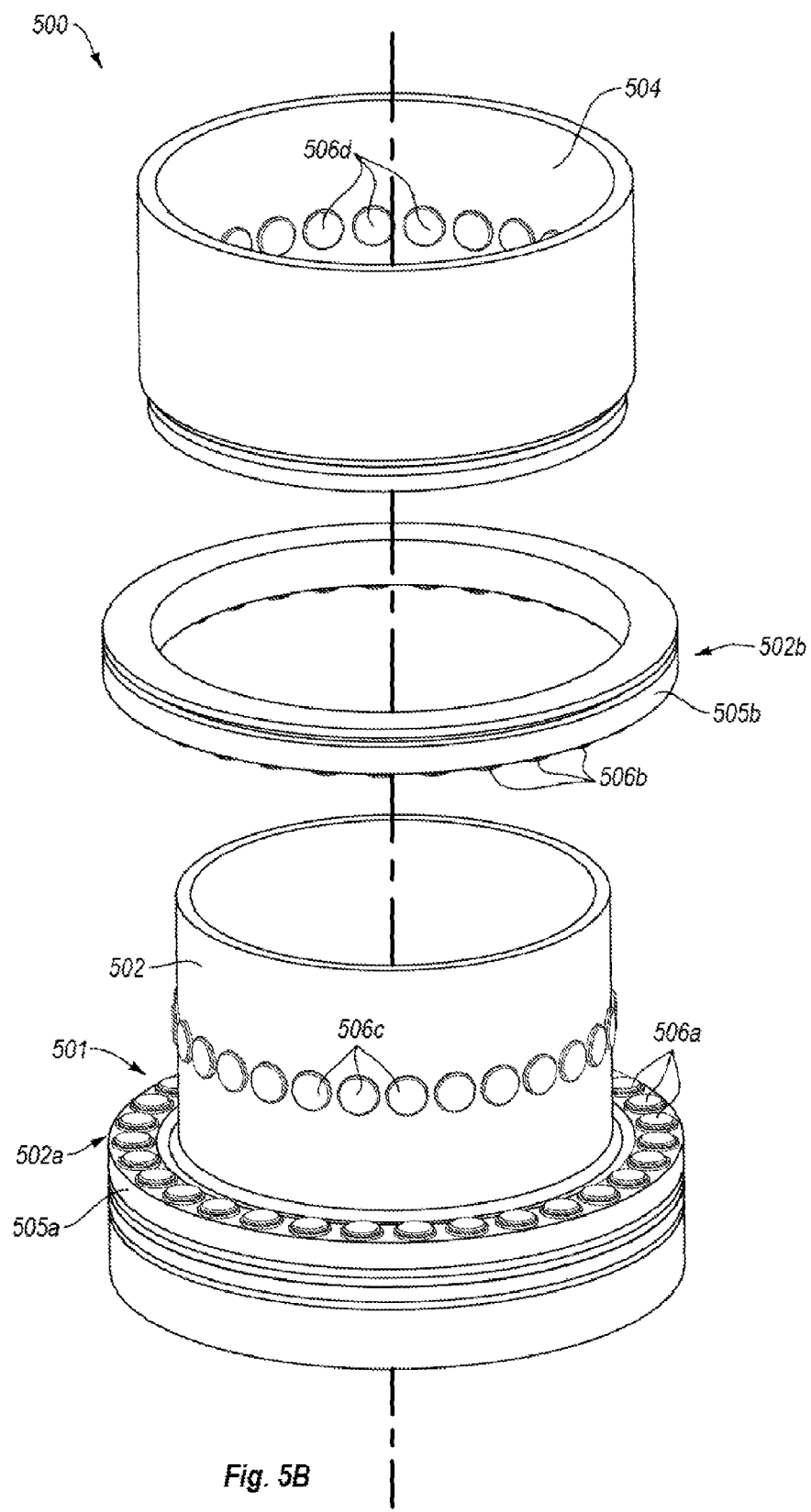
FIG. 5B is another isometric view of the bearing apparatus of FIG. 5A in an assembled configuration.

FIGS. 5A and 5B show a bearing apparatus 500 that includes both a thrust-bearing assembly and a radial bearing assembly, and which may include one material (e.g., PCD) for the thrust-bearing surfaces, while employing a different material (e.g., a non-diamond superhard material) for at least another bearing surface such as the radial bearing surfaces. In an embodiment, a portion of the thrust-bearing surfaces or radial bearing surfaces may include PCD and a portion of the thrust-bearing surfaces or radial bearing surfaces may include a non-diamond superhard material such as silicon carbide.

Bearing apparatus 500 includes a combination thrust/radial bearing assembly 501 that may include a thrust-bearing assembly 502a and a radial bearing inner race 502. In an embodiment, combination thrust/radial bearing assembly 501 may include a rotor, operatively coupled to a shaft (e.g., received through inner race 502). Bearing apparatus 500 may further include thrust-bearing assembly 502b and radial bearing outer race 504, which may operate as stator thrust and stator radial bearing components, respectively. Each thrust-bearing assembly 502a and 502b may include a respective support ring (e.g., 505a and 505b, respectively) with one or more bearing elements 506a and 506b mounted into or on the corresponding bearing ring.

Radial bearing inner race 502 of combination thrust/radial bearing assembly 501 includes one or more bearing elements 506c, while radial bearing outer race 504 includes one or more bearing elements 506d configured to be oriented in generally opposed orientation relative to bearing elements 506c. Respective bearing surfaces defined by bearing elements 506a, 506b, 506c, and 506d may be selected, as described above, so that oppositely oriented bearing surfaces are different from one another. For example, bearing elements 506a or 506b may include diamond, while the other does not include diamond, but includes a non-diamond superhard material. Similarly, bearing elements 506c or 506d may include diamond, while the other does not include diamond, but includes a non-diamond superhard material.

In another embodiment, both of thrust-bearing elements 506a and 506b and their defined bearing surfaces may include one material (e.g., diamond), while the radial bearing elements 506c and 506d and their defined bearing surfaces may include the other material (e.g., a non-diamond superhard material). In an embodiment, the thrust-bearing surfaces may comprise diamond (e.g., PCD), while the radial bearing surfaces do not comprise diamond, but include a non-diamond superhard material such as silicon carbide. Such a configuration may be employed where the thrust load is considerably greater than the radial load so that the diamond bearing surfaces employed in the thrust-bearing portion of the apparatus provide high wear resistance and thermal management characteristics associated with the high thrust load. The radial bearing surfaces may be non-diamond, allowing the apparatus to be fabricated at significantly lower cost than an embodiment where all bearing surfaces were diamond, but also providing enhanced operation characteristics (e.g., greater wear resistance, improved heat transfer, or both) as compared to an embodiment where all bearing surfaces were non-diamond.

Figure 6A:
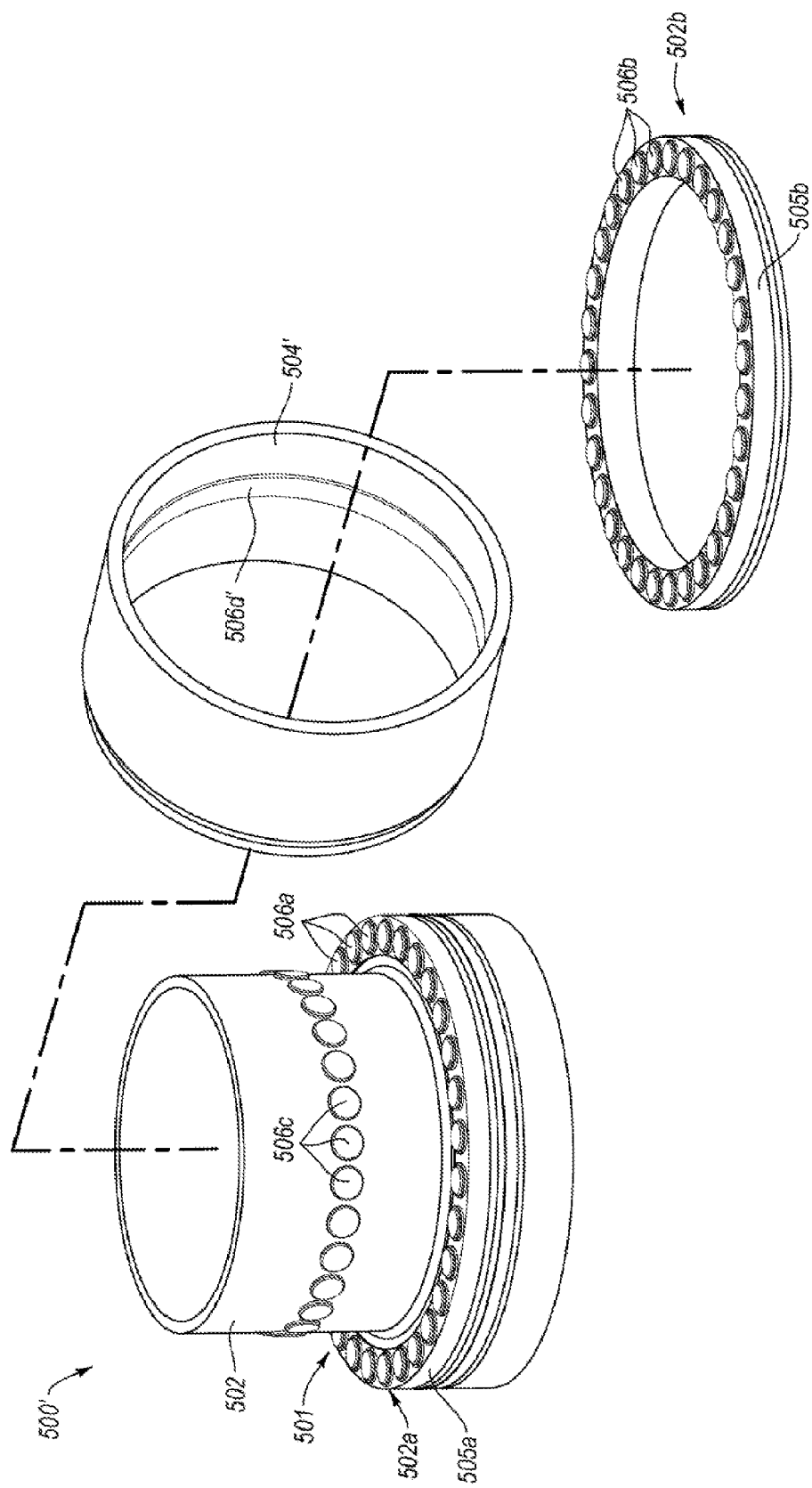
FIG. 6A is an isometric disassembled view of another embodiment of a bearing apparatus in which the stator of the radial bearing assembly includes a single substantially continuous bearing element.
Figure 6B:
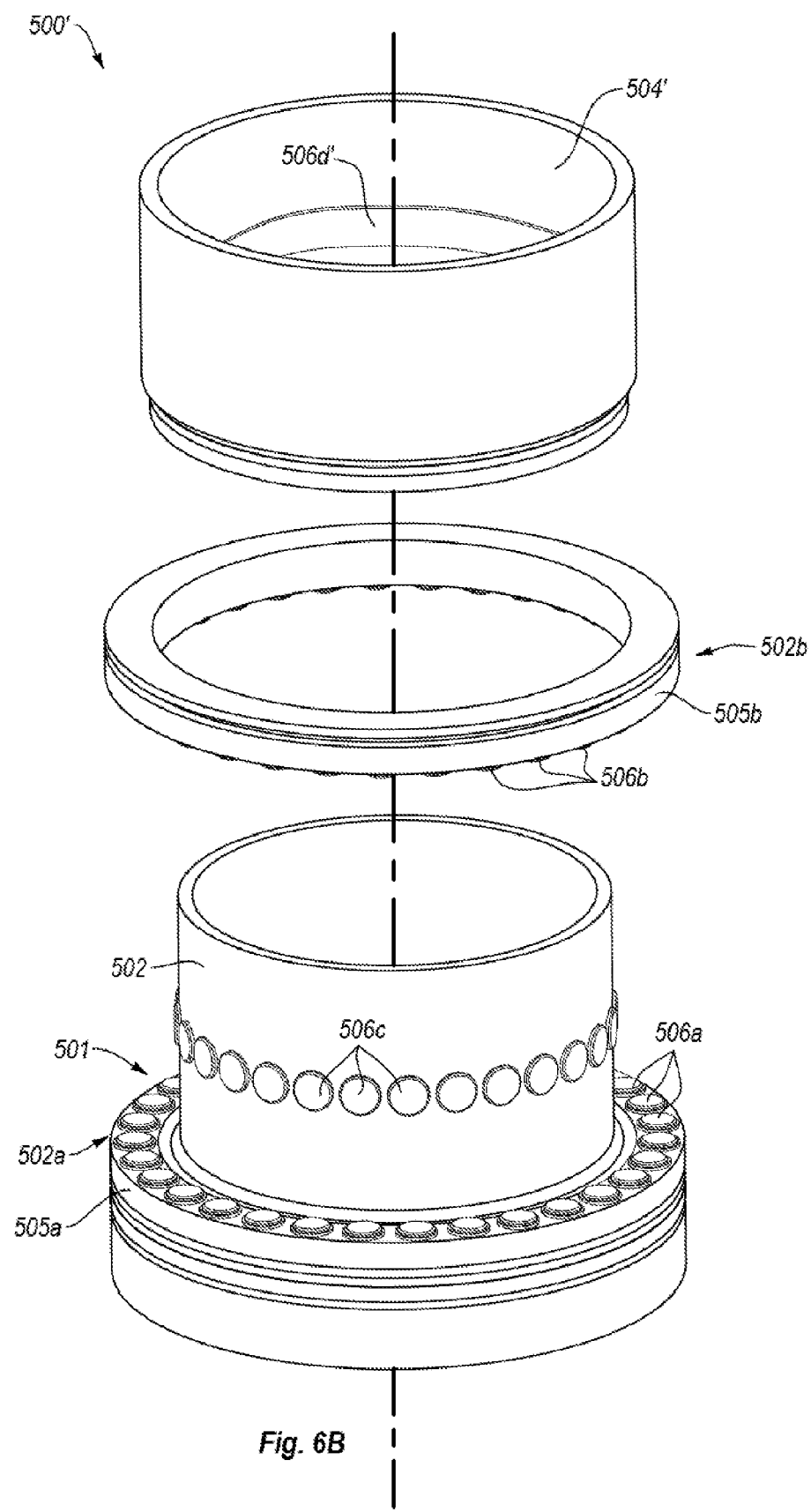
FIG. 6B is another isometric view of the bearing apparatus of FIG. 5A in an assembled configuration.

FIGS. 6A and 6B show an apparatus 500' similar to apparatus 500 of FIG. 5A according to an embodiment, but in which radial bearing outer race 504' includes a single substantially continuous bearing element 506d' rather than a plurality of separate bearing elements. Single substantially continuous bearing element 506d' may extend substantially entirely about the inside perimeter of outer race 504'. As described above, where outer race 504' serves as a stator to rotor inner race 502, the substantially continuous bearing surface may improve wear resistance and operational life of stator outer race 504'.

Another embodiment (not shown) may replace one or both thrust-bearing assemblies 502a and 502b with configurations including a single substantially continuous bearing element, rather than the illustrated configuration including a plurality of separate bearing elements.

Figure 7:
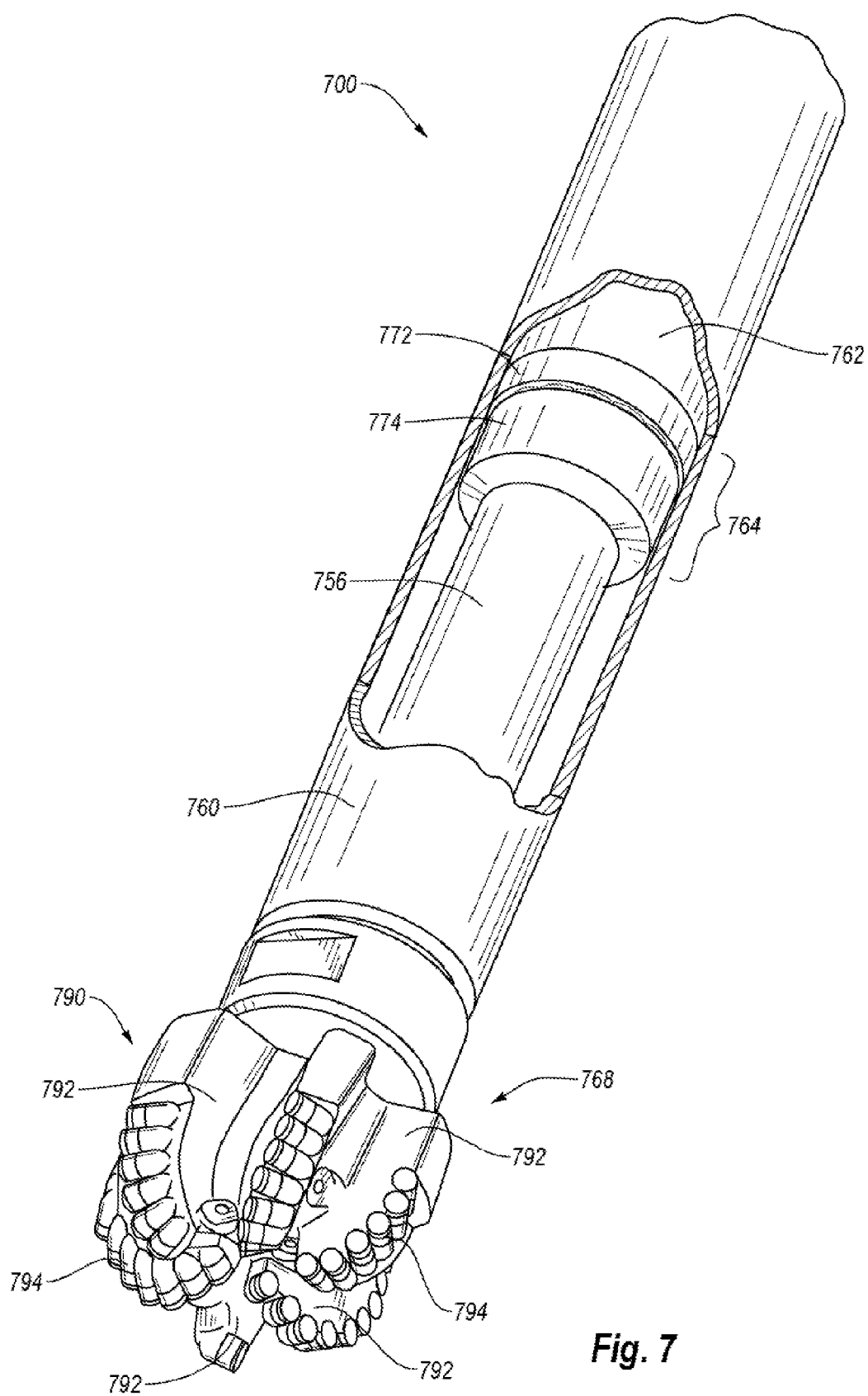
FIG. 7 is a schematic isometric cutaway view of a subterranean drilling system including one or more bearing apparatuses utilizing any of the disclosed bearing apparatuses according to various embodiments.

Any of the embodiments for bearing apparatuses discussed above may be used in a subterranean drilling system. FIG. 7 is a schematic isometric cutaway view of a subterranean drilling system 700 according to an embodiment, which may employ one or more of any of the disclosed bearing apparatus embodiments. The subterranean drilling system 700 may include a housing 760 enclosing a downhole drilling motor 762 (i.e., a motor, turbine, or any other device capable of rotating an output shaft) that may be operably connected to an output shaft 756. A thrust-bearing apparatus 764 may be operably coupled to the downhole drilling motor 762. The thrust-bearing apparatus 764 may be configured as any of the thrust-bearing apparatus embodiments disclosed herein. A rotary drill bit 768 may be configured to engage a subterranean formation and drill a borehole and may be connected to the output shaft 756. The rotary drill bit 768 is shown comprising a bit body 790 that includes radially and longitudinally extending blades 792 with a plurality of PDCs 794 secured to the blades 792. However, other embodiments may utilize different types of rotary drill bits, such as core bits and/or roller-cone bits. As the borehole is drilled, pipe sections may be connected to the subterranean drilling system 700 to form a drill string capable of progressively drilling the borehole to a greater depth within the earth.

The thrust-bearing apparatus 764 may include a stator 772 that does not rotate and a rotor 774 that may be attached to the output shaft 756 and rotates with the output shaft 756. As discussed above, the thrust-bearing apparatus 764 may be configured as any of the embodiments disclosed herein.

In operation, lubricating fluid may be circulated through the downhole drilling motor 762 to generate torque and rotate the output shaft 756 and the rotary drill bit 768 attached thereto so that a borehole may be drilled. A portion of the lubricating fluid may also be used to lubricate opposing bearing surfaces of the stator 772 and the rotor 774.

While various aspects and embodiments have been disclosed herein, other aspects and embodiments are contemplated. The various aspects and embodiments disclosed herein are for purposes of illustration and are not intended to be limiting. For example, another embodiment may employ PCD for one bearing surface, while employing a non-PCD superhard material having a hardness lower than PCD for the opposing bearing surface. In an embodiment, the superhard material may include a form of diamond exhibiting lower hardness than PCD (e.g., chemically vapor deposited diamond). Similar preferential wear characteristics may be associated with such a configuration where the non-PCD bearing surfaces wear preferentially relative to the PCD bearing surfaces. Another embodiment may employ the harder PCD material for opposed thrust-bearing surfaces while opposed radial bearing surfaces of a bearing apparatus may not include PCD, but include a non-PCD superhard material having a hardness lower than PCD. Additionally, the words "including," "having," and variants thereof (e.g., "includes" and "has") as used herein, including the claims, shall be open ended and have the same meaning as the word "comprising" and variants thereof (e.g., "comprise" and "comprises").

The invention claimed is:

1. A combination thrust-bearing and radial bearing apparatus, comprising:
   a thrust-bearing assembly including:
      a thrust-bearing stator including a thrust-bearing stator support ring and at least one superhard stator thrust-bearing element mounted to the thrust-bearing stator support ring, the at least one superhard stator thrust-bearing element including a superhard thrust stator bearing surface, the at least one superhard stator thrust-bearing element positioned about an axis of rotation; and
      a thrust-bearing rotor including a thrust rotor support ring and at least one superhard rotor thrust-bearing element mounted to the thrust rotor support ring, the at least one superhard rotor thrust-bearing element including a superhard thrust rotor bearing surface generally opposed to the superhard thrust stator bearing surface; and
   a radial bearing assembly including:
      a radial bearing stator including a radial stator support ring and at least one superhard stator radial bearing element mounted to the radial stator support ring, the at least one superhard stator radial bearing element including a superhard radial stator bearing surface, the at least one superhard stator radial bearing element positioned about the axis of rotation, the at least one superhard stator radial bearing element positioned closer to the axis of rotation than the at least one superhard stator thrust-bearing element; and
      a radial bearing rotor including a radial rotor support ring and at least one superhard rotor radial bearing element mounted to the radial rotor support ring, the at least one superhard rotor radial bearing element including a superhard radial rotor bearing surface generally opposed to the superhard radial stator bearing surface, the at least one superhard rotor radial bearing element positioned about the axis of rotation, the at least one superhard rotor radial bearing element positioned closer to the axis of rotation than the at least one superhard rotor thrust-bearing element.

2. The combination thrust-bearing and radial bearing apparatus of claim 1 wherein at least one of the superhard stator thrust-bearing surface or the superhard rotor thrust-bearing surface includes polycrystalline diamond, and at least one of the superhard stator radial bearing surface or the superhard rotor radial bearing surface includes a non-diamond superhard material.

3. The combination thrust-bearing and radial bearing apparatus of claim 2 wherein the polycrystalline diamond includes at least one material selected from the group consisting of polycrystalline diamond, natural diamond, synthetic diamond, diamond deposited by chemical vapor deposition, and diamond deposited by physical vapor deposition.

4. The combination thrust-bearing and radial bearing apparatus of claim 2 wherein the non-diamond superhard material includes at least one material selected from the group consisting of silicon carbide, tungsten carbide, tantalum carbide, another carbide exhibiting a hardness at least equal to that of tungsten carbide, and polycrystalline cubic boron nitride.

5. The combination thrust-bearing and radial bearing apparatus of claim 1 wherein at least one of the superhard stator thrust-bearing surface or the rotor thrust-bearing surface includes at least one non-diamond superhard material.

6. The combination thrust-bearing and radial bearing apparatus of claim 1 wherein at least one of the superhard stator radial bearing surface or the rotor radial bearing surface includes polycrystalline diamond.

7. The combination thrust-bearing and radial bearing apparatus of claim 1 wherein one of the superhard stator thrust-bearing surface or the superhard rotor thrust-bearing surface includes polycrystalline diamond, and wherein the other of the superhard thrust-bearing surface or the superhard rotor thrust-bearing surface includes a non-diamond superhard material.

8. The combination thrust-bearing and radial bearing apparatus of claim 1 wherein one of the superhard stator radial bearing surface or the superhard rotor radial bearing surface includes diamond, and wherein the other of the superhard stator radial bearing surface of the superhard rotor radial bearing surface includes at least one non-diamond superhard material.

9. The combination thrust-bearing and radial bearing apparatus of claim 1 wherein each of the superhard stator thrust-bearing surface and the superhard radial stator bearing surface includes at least one non-diamond superhard material.

10. The combination thrust-bearing and radial bearing apparatus of claim 1 wherein at least one of the superhard stator thrust-bearing element or the superhard rotor thrust-bearing element includes a single substantially continuous bearing surface.

11. The combination thrust-bearing and radial bearing apparatus of claim 1 wherein at least one of the superhard stator radial bearing element or the superhard rotor radial bearing element includes a single substantially continuous bearing surface.

12. The combination thrust-bearing and radial bearing apparatus of claim 1 wherein at least one of the superhard stator thrust-bearing element, the superhard rotor thrust-bearing element, the superhard stator radial bearing element or the superhard rotor radial bearing element includes a plurality of bearing elements.

13. A combination thrust-bearing and radial bearing apparatus, comprising:
   a thrust-bearing assembly including:
      a thrust-bearing stator including a thrust-bearing stator support ring and at least one superhard stator thrust-bearing element mounted to the thrust-bearing stator support ring, the at least one superhard stator thrust-bearing element including a superhard thrust stator bearing surface, the at least one superhard stator thrust-bearing element positioned about an axis of rotation; and a thrust-bearing rotor including a thrust rotor support ring and at least one superhard rotor thrust-bearing element mounted to the thrust rotor support ring, the at least one superhard rotor thrust-bearing element including a superhard thrust rotor bearing surface generally opposed to the superhard thrust stator bearing surface; and a radial bearing assembly including:

a radial bearing stator including a radial stator support ring and at least one superhard stator radial bearing element mounted to the radial stator support ring, the at least one superhard stator radial bearing element including a superhard radial stator bearing surface, the at least one superhard stator radial bearing element positioned about the axis of rotation, the at least one superhard stator radial bearing element positioned closer to the axis of rotation than the at least one superhard stator thrust-bearing element; and a radial bearing rotor including a radial rotor support ring and at least one superhard rotor radial bearing element mounted to the radial rotor support ring, the at least one superhard rotor radial bearing element including a superhard radial rotor bearing surface generally opposed to the superhard radial stator bearing surface, the at least one superhard rotor radial bearing element positioned about the axis of rotation, the at least one superhard rotor radial bearing element positioned closer to the axis of rotation than the at least one superhard rotor thrust-bearing element.

14. The combination thrust-bearing and radial bearing apparatus of claim 13 wherein at least one of the superhard stator thrust-bearing surface or the rotor thrust-bearing surface includes at least one superhard material having hardness less than polycrystalline diamond, and wherein at least one of the superhard stator radial bearing surface or the rotor radial bearing surface includes polycrystalline diamond.

15. The combination thrust-bearing and radial bearing apparatus of claim 13 wherein each of the superhard stator thrust-bearing surface and the superhard radial stator bearing surface includes at least one material having a hardness that is less than polycrystalline diamond.

16. The combination thrust-bearing and radial bearing apparatus of claim 13 wherein at least one of the superhard stator thrust-bearing element or the superhard rotor thrust-bearing element includes a single substantially continuous bearing surface.

17. The combination thrust-bearing and radial bearing apparatus of claim 13 wherein at least one of the superhard stator radial bearing element or the superhard rotor radial bearing element includes a single substantially continuous bearing surface.

18. The combination thrust-bearing and radial bearing apparatus of claim 13 wherein at least one of the superhard stator thrust-bearing surface or the superhard rotor thrust-bearing surface includes polycrystalline diamond, and at least one of the superhard stator radial bearing surface or the superhard rotor radial bearing surface includes at least one superhard material having a hardness that is lower than polycrystalline diamond.

19. The combination thrust-bearing and radial bearing apparatus of claim 18 wherein the at least one superhard material having the hardness that is lower than polycrystalline diamond includes at least one material selected from the group consisting of silicon carbide, tungsten carbide, tantalum carbide, another carbide exhibiting a hardness at least equal to that of tungsten carbide, polycrystalline cubic boron nitride, and diamond-silicon carbide composite.

20. A subterranean drilling system, comprising:

a drilling motor configured to rotate a shaft; and a combination thrust-bearing and radial bearing apparatus operably coupled to the downhill drilling motor, the combination thrust-bearing and radial bearing apparatus including:

a thrust-bearing assembly including:

a thrust-bearing stator including a thrust-bearing stator support ring and at least one superhard stator thrust-bearing element mounted to the thrust-bearing stator support ring, the at least one superhard stator thrust-bearing element including a superhard thrust stator bearing surface, the at least one superhard stator thrust-bearing element positioned about an axis of rotation; and a thrust-bearing rotor including a thrust rotor support ring and at least one superhard rotor thrust-bearing element mounted to the thrust rotor support ring, the at least one superhard rotor thrust-bearing element including a superhard thrust rotor bearing surface generally opposed to the superhard thrust stator bearing surface; and a radial bearing assembly including:

a radial bearing stator including a radial stator support ring and at least one superhard stator radial bearing element mounted to the radial stator support ring, the at least one superhard stator radial bearing element including a superhard radial stator bearing surface, the at least one superhard stator radial bearing element positioned about the axis of rotation, the at least one superhard stator radial bearing element positioned closer to the axis of rotation than the at least one superhard stator thrust-bearing element; and a radial bearing rotor including a radial rotor support ring and at least one superhard rotor radial bearing element mounted to the radial rotor support ring, the at least one superhard rotor radial bearing element including a superhard radial rotor bearing surface generally opposed to the superhard radial stator bearing surface, the at least one superhard rotor radial bearing element positioned about the axis of rotation, the at least one superhard rotor radial bearing element positioned closer to the axis of rotation than the at least one superhard rotor thrust-bearing element.

21. The subterranean drilling system of claim 20 wherein at least one of the superhard stator thrust-bearing element, the superhard rotor thrust-bearing element, the superhard stator radial bearing element, or the superhard rotor radial bearing element includes a single substantially continuous bearing surface.

22. The subterranean drilling system of claim 20 wherein at least one of the superhard stator thrust-bearing surface or the superhard rotor thrust-bearing surface includes polycrystalline diamond, and at least one of the superhard stator radial bearing surface or the superhard rotor radial bearing surface includes a non-diamond superhard material.

23. The subterranean drilling system of claim 22 wherein the non-diamond superhard material includes at least one material selected from the group consisting of silicon carbide, tungsten carbide, tantalum carbide, another carbide exhibiting a hardness at least equal to that of tungsten carbide, polycrystalline cubic boron nitride, and diamond-silicon carbide composite.

* * * * *